United States Patent
Tillmann (10) Patent No.: US 8,522,222 B2
(45) Date of Patent: Aug. 27, 2013

(54) TRACING JUST-IN-TIME COMPILATION WITH POINTERS TO LOCAL VARIABLES

(75) Inventor: Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 12/819,242

(22) Filed: Jun. 21, 2010

(65) Prior Publication Data

US 2011/0314452 A1    Dec. 22, 2011

(51) Int. Cl.
    *G06F 9/44*       (2006.01)
    *G06F 9/45*       (2006.01)

(52) U.S. Cl.
    USPC .......................... 717/148; 717/128; 717/150

(58) Field of Classification Search
    None
    See application file for complete search history.

(56) References Cited

U.S. PATENT DOCUMENTS

| | | | |
|---|---|---|---|
| 6,151,703 A | 11/2000 | Crelier | |
| 6,604,167 B1 | 8/2003 | Blandy et al. | |
| 6,851,109 B1 | 2/2005 | Alexander et al. | |
| 7,426,719 B2 * | 9/2008 | Chaiken et al. | 717/128 |
| 7,574,704 B2 * | 8/2009 | Fulton et al. | 717/150 |
| 7,617,493 B2 * | 11/2009 | Mitran et al. | 717/148 |
| 7,913,240 B2 * | 3/2011 | Kielstra et al. | 717/148 |
| 7,930,686 B2 * | 4/2011 | Mitran et al. | 717/148 |
| 8,359,496 B1 * | 1/2013 | Bornstein et al. | 717/148 |
| 2004/0003377 A1 | 1/2004 | Di Loreto | |
| 2006/0190935 A1 * | 8/2006 | Kielstra et al. | 717/148 |
| 2007/0226700 A1 * | 9/2007 | Gal et al. | 717/128 |
| 2009/0007075 A1 * | 1/2009 | Edmark et al. | 717/128 |
| 2009/0055814 A1 | 2/2009 | Gallop et al. | |
| 2009/0064113 A1 | 3/2009 | Langman et al. | |
| 2009/0144710 A1 * | 6/2009 | Kielstra et al. | 717/148 |
| 2011/0265067 A1 * | 10/2011 | Schulte et al. | 717/150 |
| 2012/0137111 A1 * | 5/2012 | Hayashizaki | 712/241 |

OTHER PUBLICATIONS

Bebenita et al., "Trace-Based Compilation in Execution Environments without Interpreters", 2010 ACM, PPPJ'10, Sep. 15-17, 2010, Vienna, Austria, pp. 59-68; <http://dl.acm.org/citation.cfm?id=1852761.1852771>.*

Böhm et al., "Generalized Just-In-Time Trace Compilation using a Parallel Task Farm in a Dynamic Binary Translator", 2011 ACM, PLDI'11, Jun. 4-8, 2011, San Jose, California, USA, pp. 1-12; <http://dl.acm.org/citation.cfm?doid=1993316.1993508>.*

Gal et al., "Trace-based Just-in-Time Type Specialization for Dynamic Languages", 2009 ACM, PLDI'09, Jun. 15-20, 2009, Dublin, Ireland, pp. 1-14; <http://dl.acm.org/citation.cfm?doid=1543135.1542528>.*

(Continued)

*Primary Examiner* — Thuy Dao
*Assistant Examiner* — Ben C Wang (57) ABSTRACT

In one embodiment, a trace optimizing engine may create an optimized trace of an operation segment of a software program. A memory may store a trace of an operation segment and an inherited stack frame from the operation segment. An optimizing trace compiler may resolve a local pointer of the operation segment to a memory object and insert a guard in the trace that invalidates the trace if the local pointer does not resolve to the memory object. A just in time compiler may receive in the trace a stack pointer to the inherited stack frame, move the stack pointer to create a storage space, and store an intermediate value for a local variable in a temporary variable in the storage space.

20 Claims, 9 Drawing Sheets

(56) References Cited

OTHER PUBLICATIONS

Bebenita et al., "SPUR: A Trace-Based JIT Compiler for CIL", 2010 Microsoft Corporation, Microsoft Research Technical Report, MSR-TR-2010-27, Mar. 2010, pp. 1-17; <http://research.microsoft.com/pubs/121449/techreport2.pdf>.*

Inoue et al., "A Trace-based Java JIT Compiler Retrofitted from a Method-based Compiler", 2011 IEEE, pp. 246-256; <http://ieeexplore.ieee.org/stamp/stamp.jsp?tp=&arnumber=5764692>.*

Ishizaki, et al., "Design, Implementation, and Evaluation of Optimizations in a Just-In-Time Compiler", Retrieved at << http://cseweb.ucsd.edu/classes/sp00/cse231/openjit.pdf >>, Java Grande Conference, Proceedings of the ACM 1999 conference on Java Grande, Jun. 12-14, 1999, pp. 10.

Adl-Tabatabai, et al., "Fast, Effective Code Generation in a Just-In-Time Java Compiler", Retrieved at << http://www.csc.lsu.edu/~gb/csc7700/Reading/p280-adl-tabatabai.pdf >>, ACM SIGPLAN Notices, vol. 33, No. 5, May 1998, pp. 11.

Clinick, Andrew., "Introducing JScript .NET", Retrieved at <<http://msdn.microsoft.com/en-us/library/-ms974588.aspx >>, Jul. 14, 2000, pp. 16.

Bala, et al., "Dynamo: A Transparent Dynamic Optimization System", Retrieved at << http://citeseerx.ist.psu.edu/viewdoc/download?doi=10.1.1.74.6227&rep=rep1&type=pdf >>, Conference on Programming Language Design and Implementation, Proceedings of the ACM SIGPLAN 2000 conference on Programming language design and implementation, Jun. 18-21, 2000, pp. 1-12.

Bebenita, et al., "Stream-Based Dynamic Compilation for Object-oriented Languages", Retrieved at <<http://www.springerlink.com/index/u16t58805r879263.pdf>>, Objects, Components, Models and Patterns, 47th International Conference, Tools Europe 2009, Jun. 29-Jul. 3, 2009, pp. 77-95.

Bebenita, et al., "Trace based Compilation in Interpreter-less Execution Environments", Retrieved at <<http://www.ics.uci.edu/~franz/Site/pubs-pdf/ICS-TR-10-01.pdf>>, Technical Report, No. 10-01, Mar. 2010, pp. 1-15.

Bolz, et al., "Tracing the Meta-level: Pypy's Tracing JIT Compiler", Retrieved at << http://codespeak.net/pypy/extradoc/talk/icooolps2009/bolz-tracing-jit.pdf >>, European Conference on Object-Oriented Programming, Proceedings of the 4th workshop on the Implementation, Compilation, Optimization of Object-Oriented Languages and Programming Systems, Jul. 6, 2009, pp. 8.

Bradel, et al., "Automatic Trace-based Parallelization of Java Programs", Retrieved at << http://citeseerx.ist.psu.edu/viewdoc/download;jsessionid=3372871CD047728C3D57640543C7922C?doi=10.1.1.75.5829&rep=rep1&type=pdf >>, ICPP, Proceedings of the 2007 International Conference on Parallel Processing, Sep. 10-14, 2007, pp. 10.

Bruening, et al., "An Infrastructure for Adaptive Dynamic Optimization", Retrieved << http://groups.csail.mit.edu/commit/papers/03/RIO-adaptive-CGO03.pdf >>, ACM International Conference Proceeding Series, vol. 37, Proceedings of the international symposium on Code generation and optimization: feedback-directed and runtime optimization, Mar. 23-26, 2003, pp. 1-11.

Chambers, et al., "Customization: Optimizing Compiler Technology for SELF, a Dynamically-typed Object-oriented Programming Language", Retrieved at << http://citeseerx.ist.psu.edu/viewdoc/download?doi=10.1.1.87.4221&rep=rep1&type=pdf >>, Proceedings of the SIGPLAN '87 symposium on Interpreters and interpretive techniques, ACM SIGPLAN Notices, vol. 24, No. 7, Jul. 1989, pp. 146-160.

Chang, et al., "Efficient Just-in-time Execution of Dynamically Typed Languages via Code Specialization using Precise Runtime Type Inference", Retrieved at <<http://www.ics.uci.edu/~franz/Site/pubs-pdf/ICS-TR-07-10.pdf >>, Technical report, 2007, pp. 1-14.

Chang, et al., "Tracing for Web 3.0: Trace Compilation for the Next Generation Web Applications", Retrieved at << http://www.christianwimmer.at/Publications/Chang09a/Chang09a.pdf >>, ACM/Usenix International Conference on Virtual Execution Environments, Proceedings of the 2009 ACM SIGPLANS/SIGOPS international conference on Virtual execution environments, Mar. 11-13, 2009, pp. 71-80.

Cuni, et al., "Faster than C#: Efficient Implementation of Dynamic Languages on .NET", Retrieved at << http://codespeak.net/pypy/extradoc/talk/icooolps2009-dotnet/cli-jit.pdf >>, European Conference on Object-Oriented Programming, Proceedings of the 4th workshop on the Implementation, Compilation, Optimization of Object-Oriented Languages and Programming Systems, Jul. 6, 2009, pp. 8.

Moura, et al., "Z3: An Efficient SMT Solver", Retrieved at << http://research.microsoft.com/en-us/um/redmond/projects/z3/z3_system.pdf >>, Tools and Algorithms for the Construction and Analysis of Systems, 14th International Conference, TACAS 2008, Held as Part of the Joint European Conferences on Theory and Practice of Software, ETAPS, Mar. 29-Apr. 6, 2008, pp. 16.

Dehnert, et al., "The Transmeta Code Morphing Software: Using Speculation, Recovery, and Adaptive Retranslation to Address Real-life Challenges", Retrieved at << http://www.ptlsim.org/papers/transmeta-cgo2003.pdf >>, Appeared in the Proceedings of the First Annual IEEE/ACM International Symposium on Code Generation and Optimization Mar. 27-29, 2003, pp. 1-10.

Gal, et al., "Trace-based Just-in-time Type Specialization for Dynamic Languages", Retrieved at << http://people.mozilla.org/~dmandelin/tracemonkey-pldi-09.pdf >>, Conference on Programming Language Design and Implementation, Proceedings of the 2009 ACM SIGPLAN conference on Programming language design and implementation, Jun. 15-20, 2009, pp. 14.

Gal, et al., "Incremental Dynamic Code Generation with Trace Trees", Retrieved at << http://www.ics.uci.edu/~franz/Site/pubs-pdf/ICS-TR-06-16.pdf >>, Technical Report, No. 06-16, Nov. 2006, pp. 1-11.

Gal, et al., "HotpathVM: An Effective JIT Compiler for Resource-constrained Devices", Retrieved at << http://citeseerx.ist.psu.edu/viewdoc/download?doi=10.1.1.108.80908&rep=rep1&type=pdf >>, ACM/Usenix International Conference on Virtual Execution Environments, Proceedings of the 2nd international conference on Virtual execution environments, Jun. 14-16, 2006, pp. 144-153.

Ha, et al., "A Concurrent Dynamic Analysis Framework for Multicore Hardware", Retrieved at << http://userweb.cs.utexas.edu/users/mckinley/papers/conc-oopsla-2009.pdf >>, Conference on Object Oriented Programming Systems Languages and Applications, Proceeding of the 24th ACM SIGPLAN conference on Object oriented programming systems languages and applications, Oct. 25-29, 2009, pp. 20.

King, James C., "Symbolic Execution and Program Testing", Retrieved at << http://lara.epfl.ch/dokuwiki/_media/sav08:king76symbolicexecution.pdf?id=sav09%Aforward_symbolic_execution&cache=cache >>, Communications of the ACM, vol. 19, No. 7, Jul. 1976, pp. 385-394.

Logozzo, et al., "RATA: Rapid Atomic Type Analysis by Abstract Interpretation Application to JavaScript Optimization", Retrieved at << http://research.microsoft.com/pubs/115734/aitypes.pdf >>, Compiler Construction, 19th International Conference, CC 2010, Held as Part of the Joint European Conferences on Theory and Practice of Software, ETAPS, Mar. 20-28, 2010, pp. 1-19.

Mathiske, Bernd., "The Maxine Virtual Machine and Inspector", Retrieved at << http://portal.acm.org/citation.cfm?id=1449838 >>, Conference on Object Oriented Programming Systems Languages and Applications, Companion to the 23rd ACM SIGPLAN conference on Object-oriented programming systems languages and applications, Oct. 19-23, 2008, pp. 739-740.

Merrill, et al., "Trace Fragment Selection within Method-based JVMS", Retrieved at << http://www.cs.virginia.edu/kim/docs/vee08.pdf >>, ACM/Usenix International Conference on Virtual Executin Enviornments, Proceedings of he fourth ACM SIGPLAN/SIGOPS international conference on Virtual execution evironments, Mar. 5-7, 2008, pp. 10.

"Dynamic Language Runtime", Retrieved at << http://www.codeplex.com/dlr/ >>, Version 28, Retrieved Date: Apr. 15, 2010, pp. 1.

Rigo, et al., "PyPy's Approach to Virtual Machine Construction", Retrieved at << http://codespeak.net/pypy/extradoc/talk/dls2006/pypy-vm-construction.pdf >>, Dynamic Languages Symposium, Companion to the 21st ACM SIGPLAN symposium on Object-oriented programming systems, languages, and applicatins, Oct. 22-26, 2006, pp. 13.

Suganuma, et al., "A Region-based Compilation Technique for Dynamic Compilers", Retrieved at << http://citeseerx.ist.psu.edu/viewdoc/download?doi=10.1.1.104.8799&rep=rep1&type=pdf >>, ACM Transactions on Programming Languages and Systems, vol. 28, No. 1, Jan. 2006, pp. 134-174.

Yermolovich, et al., "Optimization of Dynamic Languages Using Hierarchical Layering of Virtual Machines", Retrived at << http://portal.acm.org/citation.cfm?id=1640134.1640147 >>, Dynamic Languages Symposium, Proceedings of the 5th symposium on Dynamic languages, Oct. 26, 2009, pp. 79-88.

Zaleski, et al., "Yeti: A Gradually Extensible Trace Interpreter", Retrieved at << http://www.cs.toronto.edu/syslab/pubs/vee11-zaleski.pdf >>, ACM/Usenix International Conference on Virtual Execution Environments, Proceedings of the 3rd international conference on Virtual execution environments, Jun. 13-15, 2007, pp. 11.

"Common Language Infrastructure (CLI): Partitions I to VI," Retrieved at <<http://www.ecma-international.org/publications/files/ECMA-ST/Ecma-335.pdf>>, ECMA-335, Jun. 2006, pp. 1-556.

Gal, Andreas, "Efficient Bytecode Verification and Compilation in a Virtual Machine," Retrieved at <<http://codespeak.net/svn/user/cfbolz/jitpl/doc/gal_papers/Gal_thesis_efficient_bytecode_verif_compil.pdf>>, University of California, Irvine, 2006, pp. 1-138.

Gal, et al., "Trace-Base Just-in-Time Type Specialization for Dynamic Languages," Retrieved at <<http://people.mozilla.org/~dmandelin/tracemonkey-pldi-09.pdf>>, PLDI '09: Proceedings of the 2009 ACM SIGPLAN conference on Programming language design and implementation, Jun. 15-20, 2009, pp. 465-478.

Bebenita, et al., "SPUR: A Trace-Based JIT Compiler for CIL," Retrieved at <<http://research.microsoft.com/pubs/121449/techreport2.pdf>>, Microsoft Research Technical Report MSR-TR-2010-27, Mar. 2010, pp. 1-17.

\* cited by examiner

TRACING JUST-IN-TIME COMPILATION WITH POINTERS TO LOCAL VARIABLES

BACKGROUND

A compiler is a computer program that converts a set of source code into a set of object code or a set of machine code to create an executable program. Machine code is a set of instructions or data directly executable by a processor. A tracing just-in-time GIT) compiler creates a copy, herein referred to as a "trace", of the executing code in an intermediate language for the purpose of optimizing code for execution. An intermediate language is a language readable by an abstract machine for the purpose of analyzing, interpreting, or further converting or translating a software program. JIT compilation converts a set of code at runtime into code readable by a processor. A tracing JIT compiler may improve the machine code at runtime, optimizing the trace for actual execution scenarios. Such optimizations may include removing redundant actions, combining actions that may be performed simultaneously, and other improvements.

A tracing JIT compiler may monitor the execution of intermediate language code at the instruction level in order to collect a precise trace, optimize the trace, and create machine code for the optimized trace. The machine code for the optimized trace may be linked into the regular code, so that the optimized trace replaces a portion of the regular code, referred to herein as an "operation segment". Such tracing JIT compilers may be added to an interpreter to realize the execution of intermediate language code. Alternatively, the tracing JIT compilers may realize the intermediate language code execution by translation to machine code, instead of using an interpreter.

One embodiment of an execution environment may provide a program stack, with the invocation of a method creating a new stack frame. A stack is a last in, first out (LIFO) data structure. A stack frame is a machine dependent data structure containing subroutine state information. A recorded trace may be typically represented in static single assignment (SSA) form. A SSA form is an intermediate representation that assigns each variable once, with existing variables split into different versions for different values. In a SSA form, each instruction may operate on local variables and produce a value which is stored in a new unique local variable. Some of these local variables may have been initialized before the trace started. When the trace finishes, some of the derived values may have to be stored in particular local variables in the stack frames of the methods invoked along the trace.

The execution environment may have instructions to perform indirect memory accesses, such as reads or writes. An indirect memory accesses may associate a local variable with a pointer to a memory address on a stack frame on the stack. A pointer is a reference to a memory location containing a memory object. The memory address may also point to the heap, where static variables and objects are typically allocated in a language with a managed, or garbage-collected, memory, such as C++, Java®, Javascript®, or others. As the local variables are associated with a pointer to a memory address and not a value, the value stored at the memory address may be mutated by accesses to the memory location by other program threads. Such mutations of the values stored in local variables may be undetectable by a naïvely recorded trace containing just executed instructions. In some execution environments, pointers may be monitored and adjusted by the garbage collector, causing precise information about managed pointers to be beneficial to the garbage collector at all program locations, such as program locations residing in newly generated optimized trace code.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to creating an optimized trace of an operation segment of a software program. In one embodiment, a memory stores a trace of an operation segment and an inherited stack frame from the operation segment. An optimizing trace compiler resolves a local pointer of the operation segment to a memory object and inserts a guard in the trace that invalidates the trace if the local pointer does not resolve to the memory object. A JIT compiler receives in the trace a stack pointer to the inherited stack frame, moves the stack pointer to create a storage space, and stores an intermediate value for a local variable in a temporary variable in the storage space.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a compiler for a computing device.

In a trace optimizing engine, a tracing just-in-time (JIT) compiler is a compiler that creates a copy, or trace, during runtime of a section of code being profiled, such as machine code or an equivalent intermediate language of the machine code. The section of code being profiled, or profiling code, is hereinafter referred to as an operation segment. The tracing JIT compiler may create a trace for the purpose of analyzing an operation segment and optimizing that operation segment. The trace optimizing engine may create an optimized trace of an operation segment and then replace that operation segment in the software program.

The trace optimizing engine may select an operation segment for the purpose of optimization by incrementing a counter each time an operation segment, such as a loop of code, is executed. If the loop is executed more than a threshold number of times, the trace optimizing engine may create an optimized trace of that loop.

The optimized trace may lead to later execution errors. For example, the trace may be a copy of an operation segment that takes a tree format. The operation segment may have a branch of the tree that is covered by the trace and a branch that is not covered. A trace may reconstruct the original loop in this instance where the optimized trace becomes invalid because the untraced branch of the tree is taken.

Additionally, the optimized trace may make use of a pointer that describes a memory address that indicates a memory location with a memory object stored at that memory location that has been changed without the trace being updated to reflect this. The optimizing trace compiler may insert a guard into the optimized trace to guarantee that the pointer resolves to the original memory object. A guard is a check, such as an if-then statement, that invalidates the optimized trace if certain conditions are not met, in this case the pointer resolving to the memory object of the original operation segment.

In one embodiment, a trace optimizing engine may create an optimized trace of an operation segment of a profiling code. A memory may store a trace of an operation segment and an inherited stack frame from the operation segment. An optimizing trace compiler may resolve a local pointer of the operation segment to a memory object and insert a guard in the trace that invalidates the trace if the local pointer does not resolve to the memory object. A JIT compiler may receive in the trace a stack pointer to the inherited stack frame, move the stack pointer to create an auxiliary storage space, and store an intermediate value for a local variable in a temporary variable in the storage space.

Figure 1:
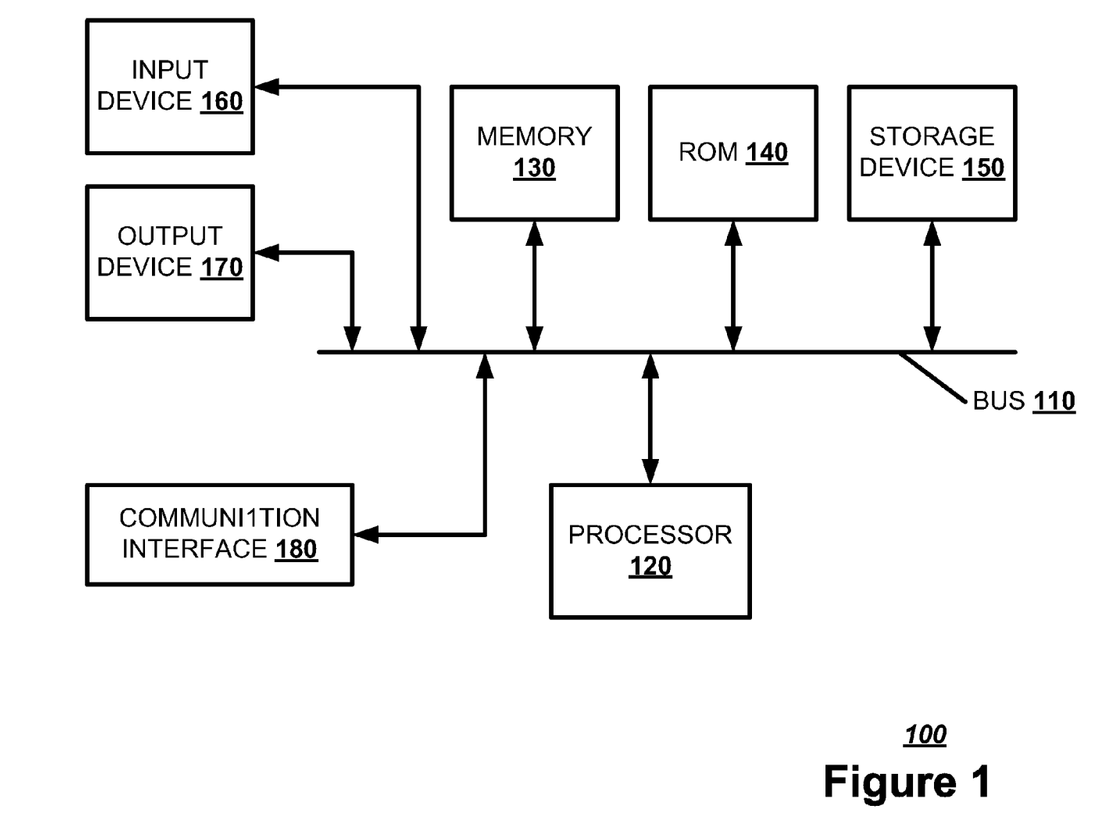
FIG. 1 illustrates, in a block diagram, one embodiment of a computing device.

FIG. 1 illustrates a block diagram of an exemplary computing device 100 which may execute a trace optimizing engine. The computing device 100 may be a personal computer, laptop, handheld computer, or other computer device. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables processing device 100 to communicate with other devices or networks. The communication interface 180 may include a network interface. The interface may be a wireless, wired, or optical interface. In one embodiment, the interface may include a universal serial bus (USB) interface, a Bluetooth® interface, or other such interface that may be used to attach peripheral devices.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

The computing device may be used to execute a trace optimizing engine. A trace optimizing engine may use a counter to determine if an operation segment of a profiling code is frequently used. The trace optimizing engine may create a trace on any frequently-used operation segment. The trace optimizing engine may then optimize the trace and then substitute the optimized trace for the original operation segment in the profiling code.

Figure 2:
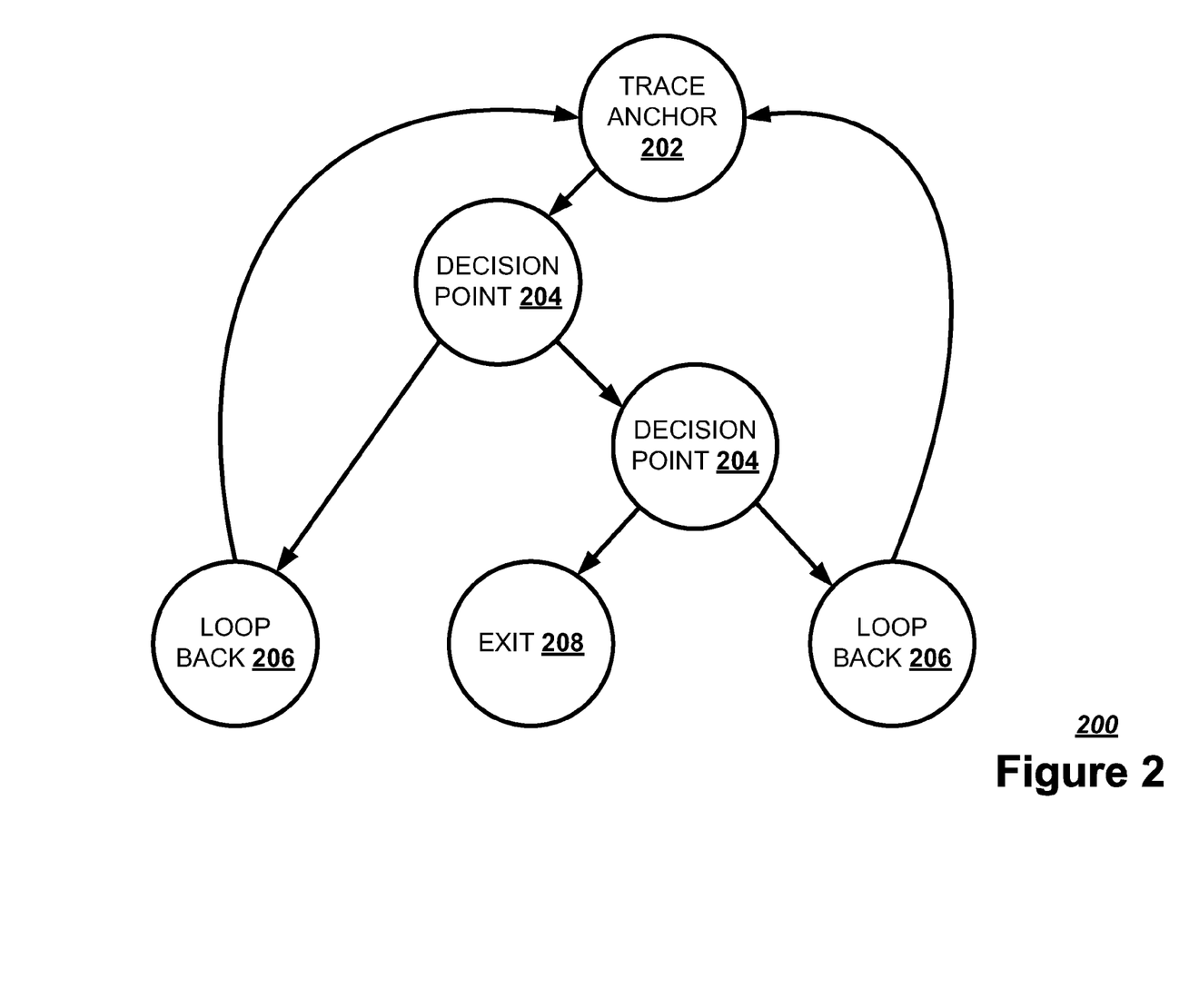
FIG. 2 illustrates, in a block diagram, one embodiment of a trace tree.

The selected operation segment may take the form of a trace tree. FIG. 2 illustrates, in a block diagram, one embodiment of a trace tree 200. The trace tree 200 may begin at a trace anchor 202, the point in program at which a trace begins. The trace tree 200 may reach a decision point 204, where a processor 120 may decide which instruction path in a program to follow, such as an if-then statement. The trace tree 200 may reach a loop back point 206, where a processor 120 may return to a trace anchor 202. The operation segment from the trace anchor 202 to the loopback point 206 is referred to as a loop. If the loop is executed in machine code, the loop is a machine language loop. If the loop is executed in an intermediate language, the loop is an intermediate language loop. A processor 120 may choose an instruction path that reaches an exit point 208 rather than a loop back point 206. The exit point 208 is a point in the instruction path that avoids looping back to the trace anchor 202.

Figure 3:
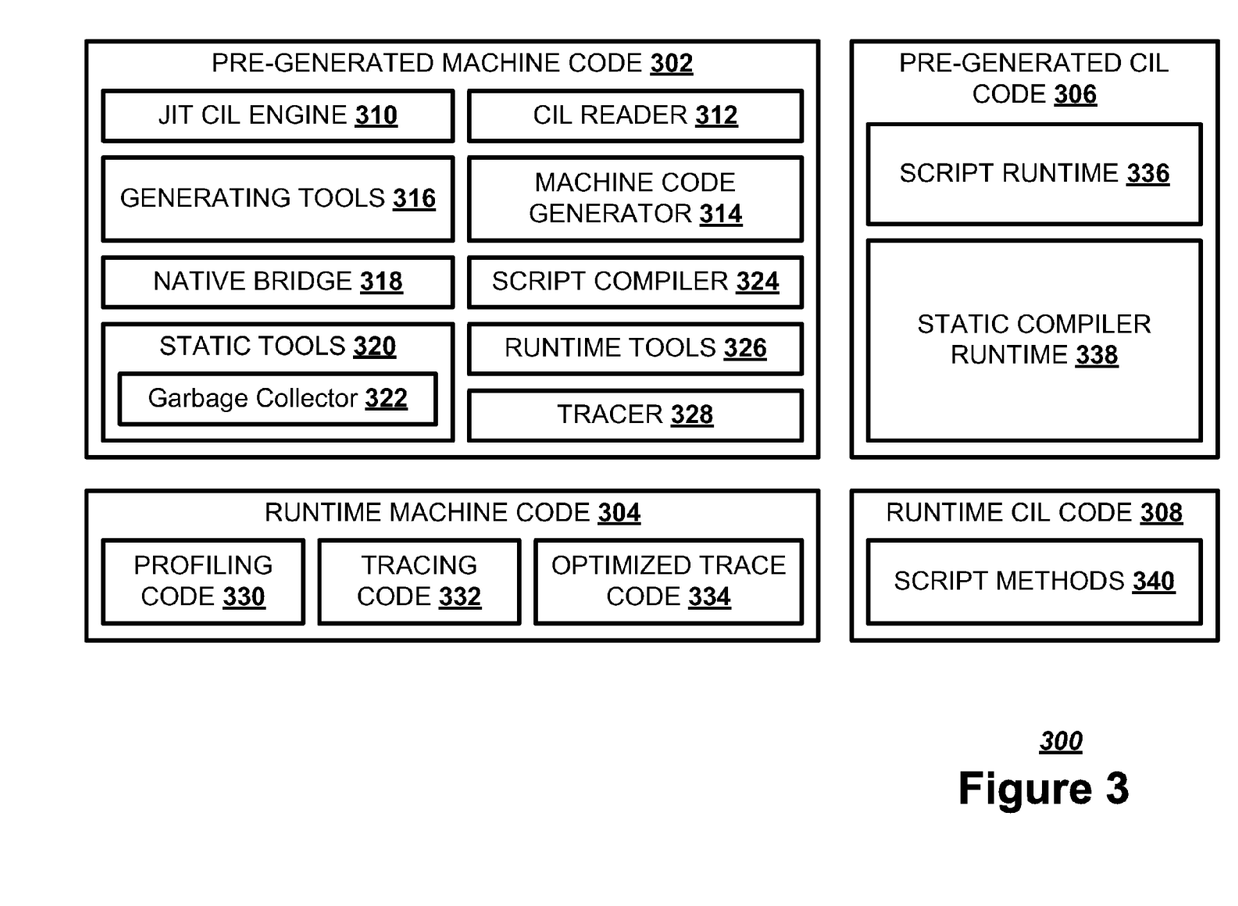
FIG. 3 illustrates, in a block diagram, one embodiment of code modules used by a trace optimizing engine.

FIG. 3 illustrates, in a block diagram, one embodiment of program modules 300 used by a trace optimizing engine. The program modules 300 may be divided into machine code and common intermediate language (CIL) code. Machine code is a set of instructions or data directly executable by a processor 120. The machine code may be pre-generated prior to execution 302 or generated at runtime 304. CIL code is a set of instructions or data in a language executable by a software simulation of a computer to aid in the analysis of a computer program. The CIL code may be pre-generated prior to execution 306 or generated at runtime 308.

The pre-generated machine code 302 may refer to a JIT CIL engine 310. A JIT CIL engine 310 is a specialized software program to process CIL code at runtime. A JIT CIL engine may manage a CIL reader 312 and a machine code generator 314. The CIL reader 312 is a module that translates CIL code. The machine code generator 314 generates machine code based on the translated CIL code. The machine code generator 314 may use a set of generating tools 316, such as a stub, a garbage collector (GC) table, an exception handle (EH) table, or other tools used to generate machine code. The pre-generated machine code 302 may refer to a native bridge 318, which generates code using the same types, object layouts, calling conventions, and other tools as a static compiler, or non JIT compiler.

The pre-generated machine code 302 may refer to a set of static compiler runtime tools 320. The static compiler runtime tools 320 may include a garbage collector module 322, an exception handling module, or other runtime tools. A garbage collector module 322 is a software module that manages memory by reclaiming unused memory or memory currently assigned to unused objects. An exception handling module manages a programs reaction to changes from a program flow.

The pre-generated machine code 302 may refer to a web script compiler 324, such as a JavaScript ® compiler. A web script is a scripting language enabling access to objects within a host environment. A web script compiler 324 may perform parsing, static analysis, and CIL code generation. The web script compiler 324 may use a set of web script runtime tools 326, similar to the static compiler runtime tools 320.

The pre-generated machine code 302 may refer to a tracer module 328, which generates a trace based on the execution of a software program. The tracer module 328 may receive a callback from tracing code, one per instruction. The tracer module 328 may generate an optimized CIL code for frequently used traces, referred to as hot traces.

The runtime machine code 304 may refer to profiling code 330, tracing code 332, or optimized trace code 334 generated by the JIT CIL engine 310. Profiling code 330 is operating code that performs the instructions of a computer program. Tracing code 332 is code detailing program actions gathered during execution. If tracing is aborted, the JIT CIL engine 310 may return to profiling. Optimized tracing code 334 is an optimized version of the tracing code 332. The profiling code 330, the tracing code 332, and the optimized tracing code 334 may share stack frames and register allocations at any transition point.

The pre-generated CIL code 306 may refer to web script runtime tools 336 and static compiler runtime tools 338. The JIT CIL engine 310 may use the web script runtime tools 336 and the static compiler runtime tools 338 to dynamically generate code. The runtime CIL code 306 may refer to any web script methods 340 created by the web script compiler 324.

Figure 4:
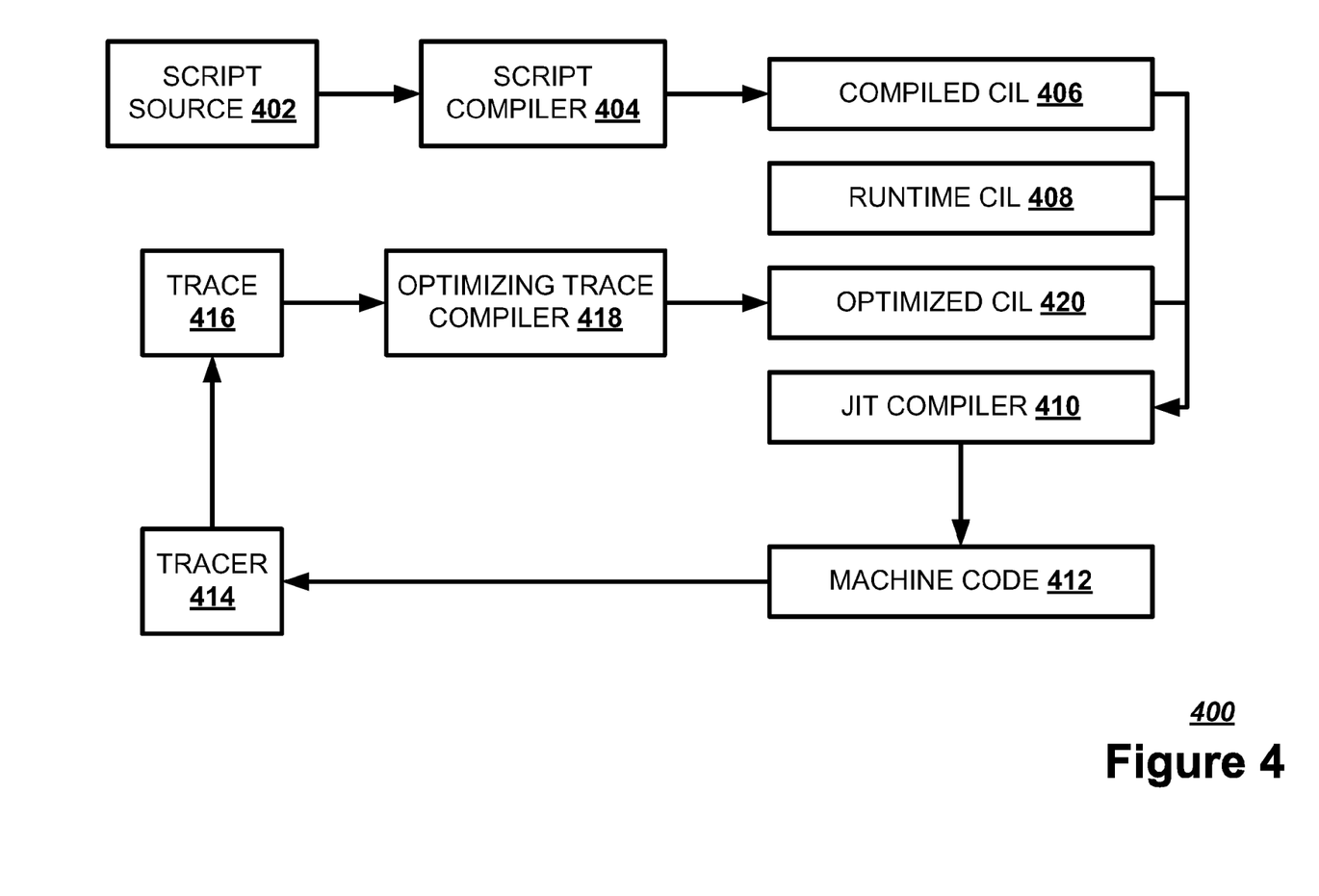
FIG. 4 illustrates, in a block diagram, one embodiment of a trace optimizing engine.

FIG. 4 illustrates, in a block diagram, one embodiment of a trace optimizing engine 400. A processor 120 may feed a web script source code 402 to a web script compiler 404 to generate a set of compiled CIL code 406. The processor 120 may feed a set of compiled CIL code 406 and a set of runtime generated CIL code 408 to a JIT compiler 410 to generate a set of machine code 412. The processor 120 may feed a frequently-used operation segment from the machine code 412 to a tracer 414 to generate a set of trace code 416. The processor may forgo translating the CIL code 406 into machine code 412 for purposes of tracing. The processor 120 may feed the set of trace code 416 to an optimizing trace compiler 418 to generate a set of optimized CIL code 420. The processor 120 may replace an operation segment of the compiled CIL code 406 with an optimized CIL code 420.

The JIT compiler 410 may initialize a pointer when generating the set of machine code 412 before the trace begins. A pointer is a data structure describing an address in a computer memory storing a memory object. The optimizing trace compiler 418 may resolve the pointer to the referenced memory object so that the newly optimized trace may operate more effectively. When the optimizing trace compiler 418 resolves such pointers, the optimized trace may not operate correctly if the pointers do not resolve to the same memory objects as intended in the original operation segment. Thus, the optimizing trace compiler 418 may insert a guard to ensure that a pointer in the optimized trace resolves to the same memory object as that of the operation segment.

Figure 5:
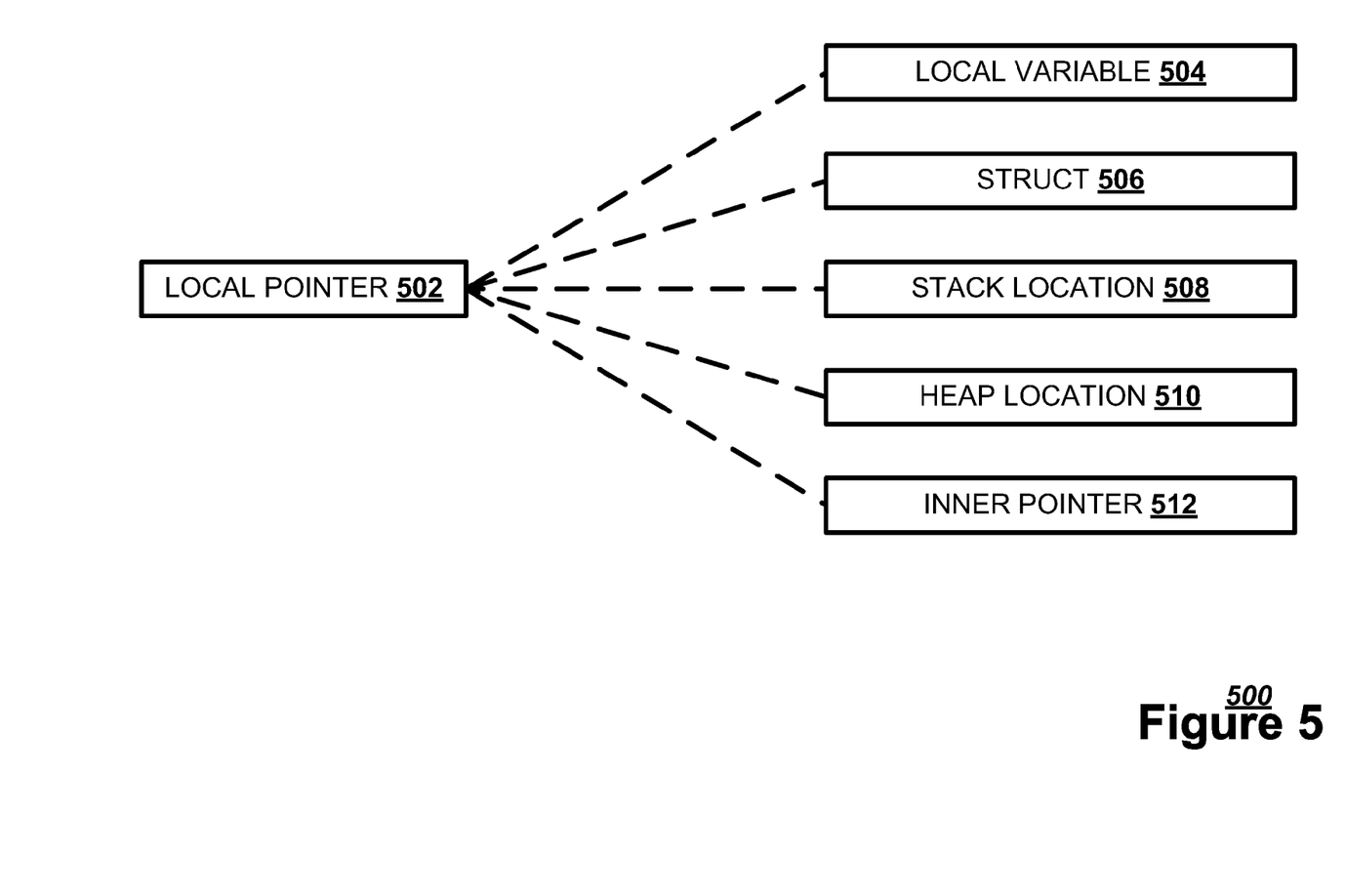
FIG. 5 illustrates, in a block diagram, one embodiment of a pointer.

A pointer may increase the efficiency of repetitive operations, such as copying and dereferencing. FIG. 5 illustrates, in a block diagram, one embodiment of a local pointer relationship 500. The local pointer 502 may refer to a memory object, such as a local variable 504, a struct 506, a stack location 508, a heap location 510, or even an inner pointer 512. A local variable 504 is a data storage element accessible from the function or block declaring the local variable 504. A struct 506 is a structured data storage type combining a set of memory objects into a single memory object. The set of memory objects may have memory objects of different types. The struct 506 may order the set of memory objects being combined. A stack location 508 is a memory address for a last in, first out (UFO) data structure. A heap location 510 is a dynamically allocated memory location. An inner pointer 512 is a second pointer referenced by local pointer 502. The inner pointer 512 may reference a second memory object.

Figure 6:
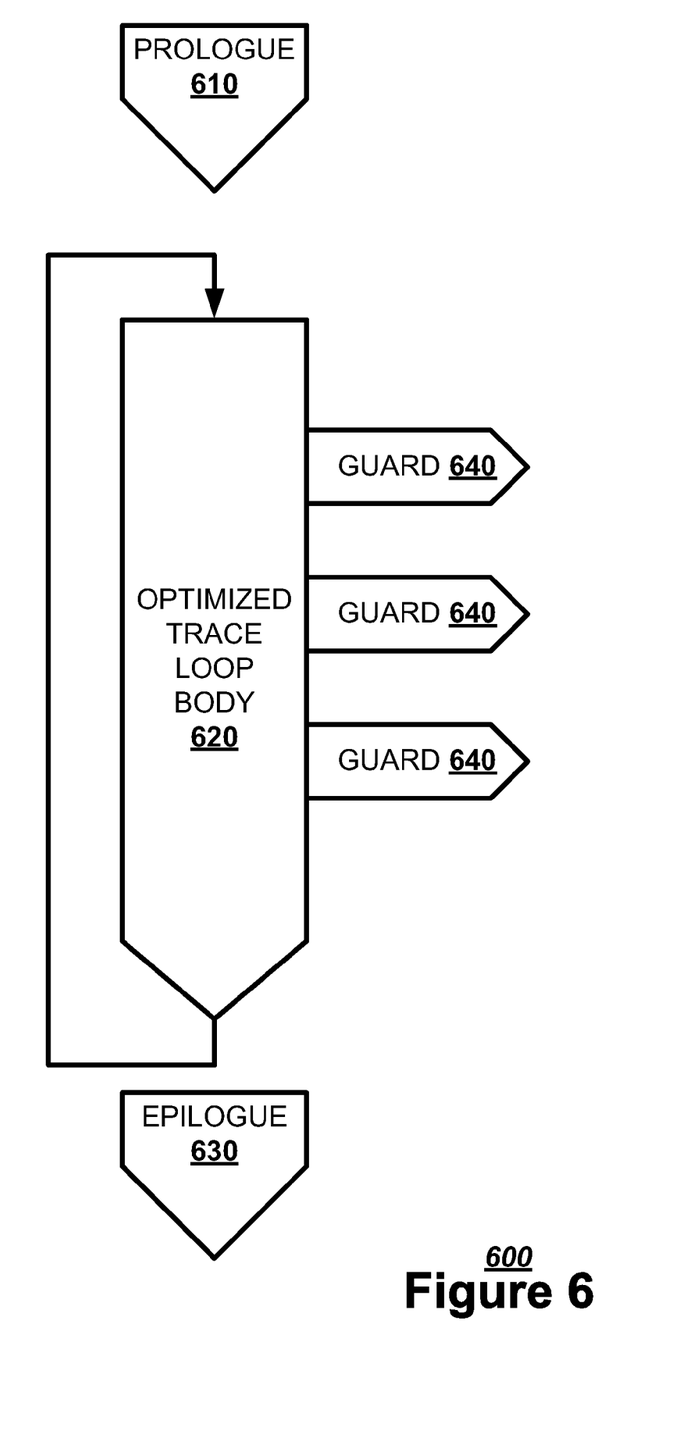
FIG. 6 illustrates, in a block diagram, one embodiment of an optimized trace body.

FIG. 6 illustrates, in a block diagram, one embodiment of an optimized trace 600. An optimized trace prologue 610 is an operation segment that may lead into an optimized trace loop body 620. After the optimized trace loop body 620 has gone through an effective number of iterations, the program may continue onto an operation segment acting as an optimized trace epilogue 630. The optimizing trace compiler 418 may insert into the optimized trace loop body 620 a set of one or more guards 640. A guard 640 may be an if-then statement that invalidates the optimized trace loop body 620 if the local pointer does not resolve to the memory object.

Figure 7:
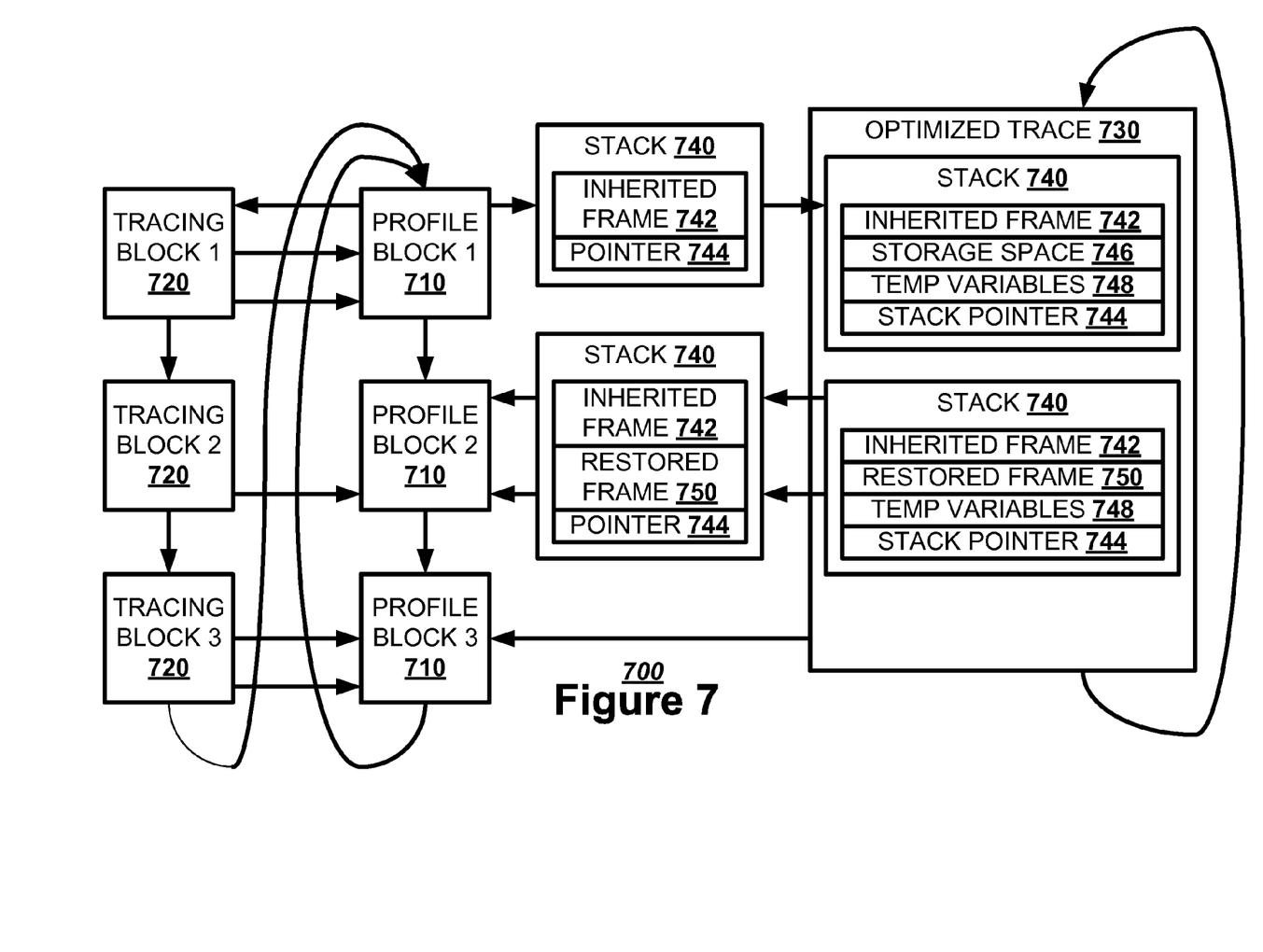
FIG. 7 illustrates, in a block diagram, one embodiment of a stack frame transition.

FIG. 7 illustrates, in a block diagram, one embodiment of a stack frame transition 700. A trace optimizing engine 400 may initiate a counting logic to determine whether use of an operation segment exceeds a specified threshold. If so, one or more profiling code blocks 710 may be used to generate one or more tracing code blocks 720. The profiling code blocks 710 and the tracing code blocks 720 may share a stack frame layout.

The optimizing trace compiler 418 may convert the tracing code blocks 720 to an optimized trace code 730. The optimizing trace compiler 418 may override the counting logic with the optimized trace code 730. The optimized trace code 730 may inherit a stack 740 used by the profiling code blocks 710.

The stack 740 may have an inherited frame 742 indicated by a stack pointer 744. The optimized trace 730 may move the stack pointer 744 to create a storage space 746 in the stack 740, for example by decrementing the stack pointer 744. The optimized trace 730 may store the intermediate values for any local variables in a temporary variable 748 in the storage space 746. For example, the optimized trace 730 may store a pointer address in a temporary pointer variable. The optimized trace 730 may reconstruct a restored stack frame 750 for passing back to the profiling code block 710 using the intermediate values stored in the temporary variables 748. Upon completion by the optimized trace code 730, the optimized trace code 730 may move the stack pointer 744 to release the local variables 748, for example by incrementing the stack pointer 744.

Figure 8:
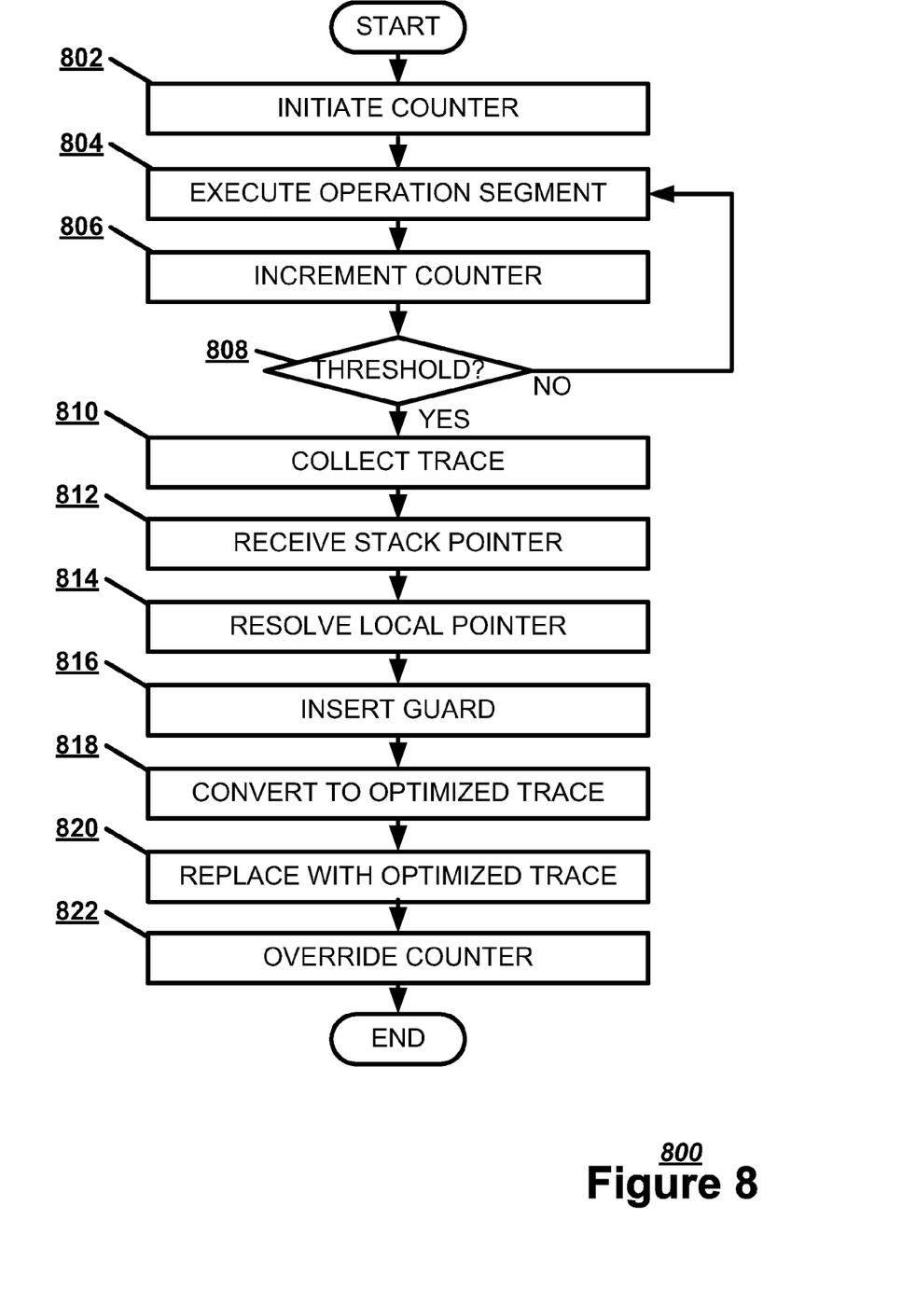
FIG. 8 illustrates, in a flowchart, one embodiment of a method for creating an optimized trace.

FIG. 8 illustrates, in a flowchart, one embodiment of a method 800 for creating an optimized trace. The trace optimizing engine 400 may select the operation segment based on a counter. The trace optimizing engine 400 may initiate a counter (Block 802). The trace optimizing engine 400 may execute an operation segment of a profiling code (Block 804). The profiling code may be in machine language or intermediate language, and the operation segment may be a machine language loop or an intermediate language loop. The trace optimizing engine 400 may increment the counter for each execution of the operation segment (Block 806). If the counter is not above a specified threshold (Block 808), the trace optimizing engine 400 may wait until the operation segment is executed again (Block 804). If the counter is above a specified threshold (Block 808), the tracer 414 may collect a trace of the operation segment of the profiling code (Block 810). The optimizing trace compiler 418 may receive a stack pointer 744 for an inherited stack frame 742 (Block 812). The optimizing trace compiler 418 may resolve any local pointers in the operation segment to a memory object (Block 814). The optimizing trace compiler 418 may insert a guard 640 in the trace 720 that invalidates the trace 720 if the local pointer does not resolve to the memory object (Block 816). The optimizing trace compiler 418 may convert the trace 720 to an optimized trace 730 (Block 818). The trace optimizing engine 400 may replace the operation segment with the optimized trace 730 (Block 820). The trace optimizing engine 400 may then override the counter (Block 822).

Figure 9:
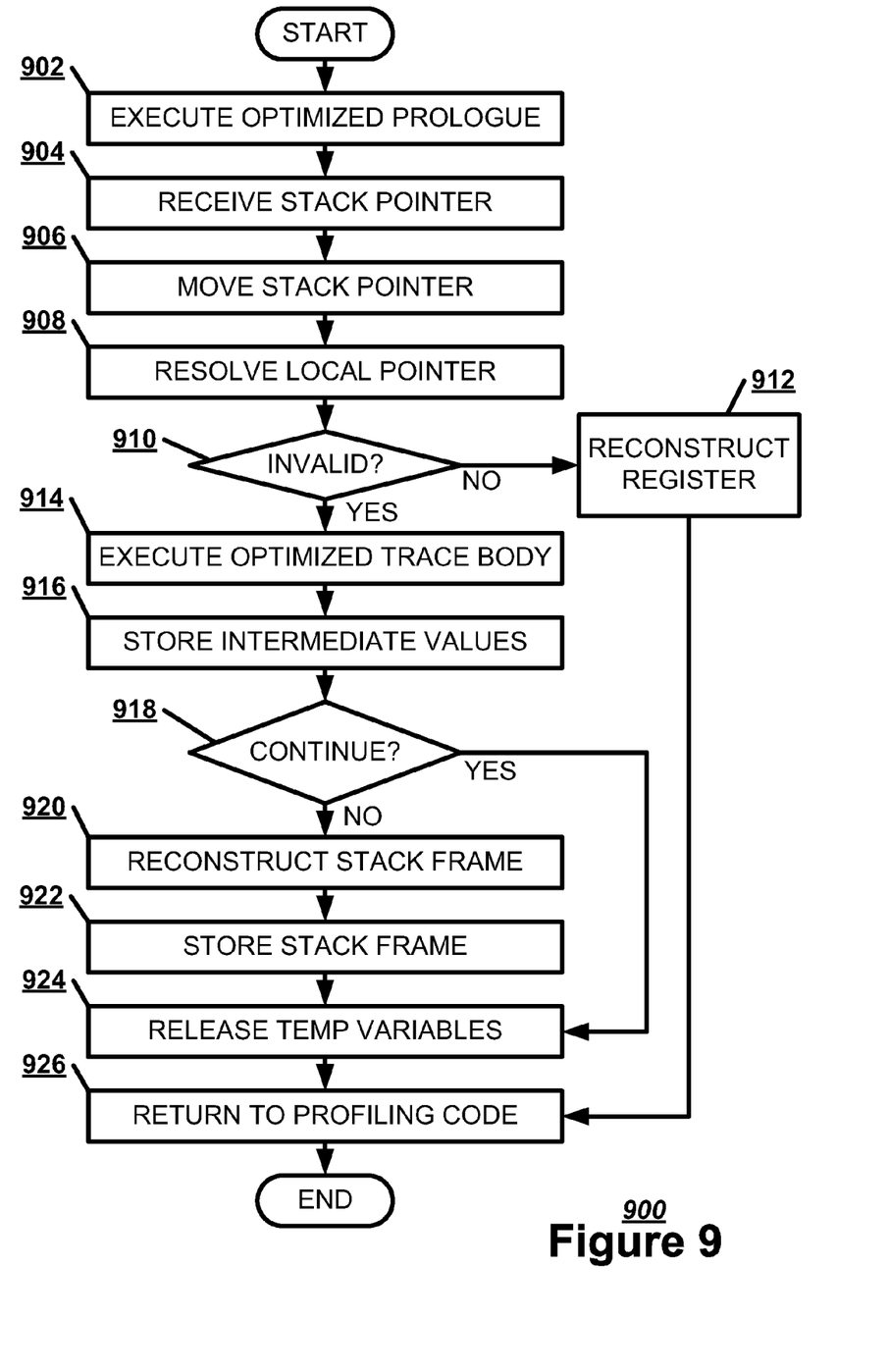
FIG. 9 illustrates, in a flowchart, one embodiment of a method for executing an optimized trace.

FIG. 9 illustrates, in a flowchart, one embodiment of a method 900 for executing an optimized trace. The JIT compiler 410 may execute the optimized trace prologue 610 (Block 902). The optimized trace prologue 610 may receive in the trace a stack pointer 744 to an inherited stack frame 742 from the operation segment (Block 904). The optimized trace prologue 610 may move the stack pointer 744 to create a storage space 746 (Block 906). The optimized trace prologue 610 may decrement the stack pointer to create the auxiliary storage space 746. The optimized trace prologue 610 may resolve any local pointers in the optimized trace code 730 (Block 908). If any of the local pointers do not resolve to a memory object indicated in a guard, thus invalidating the optimized trace (Block 910), the optimized trace prologue 610 may reconstruct any registers used during execution to match the state of the operation segment, recreating the unoptimized version of the state of the operation segment (Block 912). If the local pointers resolve to the memory objects indicated in the guard (Block 910), the JIT compiler 410 may execute the optimized trace body 620 (Block 914). The optimized trace body 620 may perform optimized versions of the operations of the original operation segment, such as executing a loop. The optimized trace body 620 may store intermediate values for any local variables in temporary variables 748 in a storage space 746 (Block 916). The optimized trace body 620 may contain further guards 640 that determine if execution may continue within the optimized trace body 620 based on whether the local pointers resolve to the memory object indicated in those guards. If these guards 640 determine that execution may not continue (Block 918), the optimized trace body 620 may create a reconstructed stack frame 750 using the intermediate values for return to the profiling code (Block 920). The optimized trace body 620 may store the reconstructed stack frame 750 in the storage space 746 (Block 922). The optimized trace body 620 may move the stack pointer 744 to release the temporary variables 748 in the storage space 746 (Block 924). The optimized trace body 620 may increment the stack pointer to remove the auxiliary storage space 746. The optimized trace body 620 may return control with any reconstructed stack frame 750 to the profiling code (Block 926).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RANI, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A machine-implemented method for just-in-time trace compilation, comprising:
    collecting a trace of an operation segment of a profiling code;
    resolving a local pointer of the operation segment to a memory object;
    inserting a guard in the trace that invalidates the trace if the local pointer does not resolve to the memory object;
    receiving in the trace a stack pointer to an inherited stack frame from the operation segment;
    moving the stack pointer to create a storage space; and
    storing an intermediate value for a local variable in a temporary variable in the storage space.

2. The method of claim 1, wherein the memory object is at least one of a local variable, a struct, a stack location, a heap location, and an inner pointer.

3. The method of claim 1, wherein the operation segment is a machine language loop.

4. The method of claim 3, further comprising:
    selecting the machine language loop based on a counter.

5. The method of claim 1, further comprising:
    converting the trace to an optimized trace; and
    replacing the operation segment with the optimized trace.

6. The method of claim 1, further comprising:
    reconstructing a register to match a state of the operation segment if the trace is invalidated.

7. The method of claim 1, further comprising:
    creating a reconstructed stack frame using the intermediate value.

8. The method of claim 7, further comprising:
    storing the reconstructed stack frame in the storage space.

9. The method of claim 1, further comprising:
    moving the stack pointer to release the temporary variable.

10. A tangible non-transitory machine-readable medium having a set of instructions detailing a method stored thereon that when executed by one or more processors cause the one or more processors to perform the method, the method comprising:
    collecting a trace of an operation segment of a profiling code;
    resolving a local pointer of the operation segment to a memory object; and
    inserting a guard in the trace that invalidates the trace if the local pointer does not resolve to the memory object
    receiving in the trace a stack pointer to an inherited stack frame from the operation segment;
    moving the stack pointer to create an auxiliary storage space; and
    storing an intermediate value for a local variable in a temporary variable in the storage space.

11. The tangible machine-readable medium of claim 10, wherein the method further comprises:
    creating a reconstructed stack frame using the intermediate value for return to the profiling code.

12. The tangible machine-readable medium of claim 11, wherein the method further comprises:
    storing the reconstructed stack frame in the storage space.

13. The tangible machine-readable medium of claim 10, wherein the method further comprises:
    reconstructing a register to match a state of the operation segment.

14. The tangible machine-readable medium of claim 10, wherein the method further comprises:
    moving the stack pointer to release the temporary variable upon return to the profiling code.

15. The tangible machine-readable medium of claim 10, wherein the method further comprises:
    converting the trace to an optimized trace; and
    replacing the operation segment with the optimized trace.

16. A trace optimizing engine for a computing device, comprising:
    a memory to store a trace of an operation segment of a profiling code and an inherited stack frame from the operation segment; and
    a processor to execute:
        an optimizing trace compiler that resolves a local pointer of the operation segment to a memory object and inserts a guard in the trace that invalidates the trace if the local pointer does not resolve to the memory object; and
        a just-in-time compiler that receives in the trace a stack pointer to the inherited stack frame, moves the stack pointer to create a storage space, and stores an intermediate value for a local variable in a temporary variable in the storage space.

17. The trace optimizing engine of claim 16, wherein the just-in-time compiler creates a reconstructed stack frame using the intermediate value.

18. The trace optimizing engine of claim 17, wherein the just-in-time compiler stores the reconstructed stack frame in the storage space.

19. The trace optimizing engine of claim 16, wherein the just-in-time compiler moves the stack pointer to release the temporary variable upon return to the profiling code.

20. The trace optimizing engine of claim 16, wherein the operation segment is a machine language loop selected based on a counter.

* * * * *